United States Patent
Read et al.

(10) Patent No.: US 6,772,842 B2
(45) Date of Patent: Aug. 10, 2004

(54) CURVED FLAPPER VALVE

(75) Inventors: Dennis M. Read, Manvel, TX (US); Alfred Hernandez, Pearland, TX (US); Juan A. Campos, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/235,078

(22) Filed: Sep. 5, 2002

(65) Prior Publication Data

US 2004/0000407 A1 Jan. 1, 2004

Related U.S. Application Data

(60) Provisional application No. 60/392,673, filed on Jun. 27, 2002.

(51) Int. Cl.[7] ............................................. E21B 34/10
(52) U.S. Cl. ....................... 166/332.8; 166/373; 251/359
(58) Field of Search .................. 166/321, 323, 166/331, 332.2, 332.8; 251/298, 359, 360, 363

(56) References Cited

U.S. PATENT DOCUMENTS

| | | | |
|---|---|---|---|
| 2,162,578 A | 6/1939 | Hacker | |
| 2,849,207 A | 8/1958 | Conrad | |
| 4,427,071 A | 1/1984 | Carmody | |
| 4,433,702 A | 2/1984 | Baker | |
| 4,457,376 A | 7/1984 | Carmody et al. | |
| 4,457,379 A | 7/1984 | McStravick | |
| 4,531,587 A | 7/1985 | Fineborg | |
| 4,776,400 A | 10/1988 | Jacob et al. | |
| 4,813,481 A | * 3/1989 | Sproul et al. | 166/51 |
| 4,926,945 A | 5/1990 | Pringle et al. | |
| 4,983,803 A | 1/1991 | Pringle et al. | |
| 4,986,358 A | 1/1991 | Luedrs et al. | |
| 5,125,457 A | 6/1992 | Meaders | |
| 5,137,089 A | 8/1992 | Smith et al. | |
| 5,137,090 A | 8/1992 | Hare et al. | |
| 5,145,005 A | 9/1992 | Dollison | |
| 5,188,182 A | * 2/1993 | Echols et al. | 166/376 |
| 5,263,847 A | 11/1993 | Akkerman et al. | |
| 5,310,005 A | 5/1994 | Dollison | |
| 5,323,859 A | 6/1994 | Smith et al. | |
| 5,564,502 A | 10/1996 | Crow et al. | |
| 5,682,921 A | 11/1997 | Rawson et al. | |
| 5,823,265 A | * 10/1998 | Crow et al. | 166/373 |
| 5,862,864 A | 1/1999 | Whiteford | |
| 5,918,858 A | 7/1999 | Rawson et al. | |
| 6,079,497 A | * 6/2000 | Johnston et al. | 166/324 |
| 6,209,663 B1 | 4/2001 | Hosie | |
| 6,230,808 B1 | 5/2001 | French et al. | |
| 6,263,910 B1 | 7/2001 | Davis et al. | |
| 6,289,926 B1 | 9/2001 | Dennistoun | |
| 6,315,047 B1 | 11/2001 | Deaton et al. | |
| 6,328,109 B1 | 12/2001 | Pringle et al. | |
| 2001/0007284 A1 | 7/2001 | French et al. | |

FOREIGN PATENT DOCUMENTS

| | | |
|---|---|---|
| WO | WO 97/28349 | 8/1997 |
| WO | WO 98/59150 | 12/1998 |
| WO | WO 00/17482 | 3/2000 |
| WO | WO 01/36787 A1 | 5/2001 |

* cited by examiner

*Primary Examiner*—Frank Tsay
(74) *Attorney, Agent, or Firm*—Bryan W. White; Jeffrey E. Griffin; Brigitte Jeffery Echols

(57) ABSTRACT

A flapper valve having a curved flapper and a seat, the flapper and seat each having complementary undulating and tapered perimeters, with sealing surfaces designed to maintain seal integrity under higher pressure, for a given outer diameter to inner diameter ratio, compared to prior art flapper valves.

24 Claims, 3 Drawing Sheets

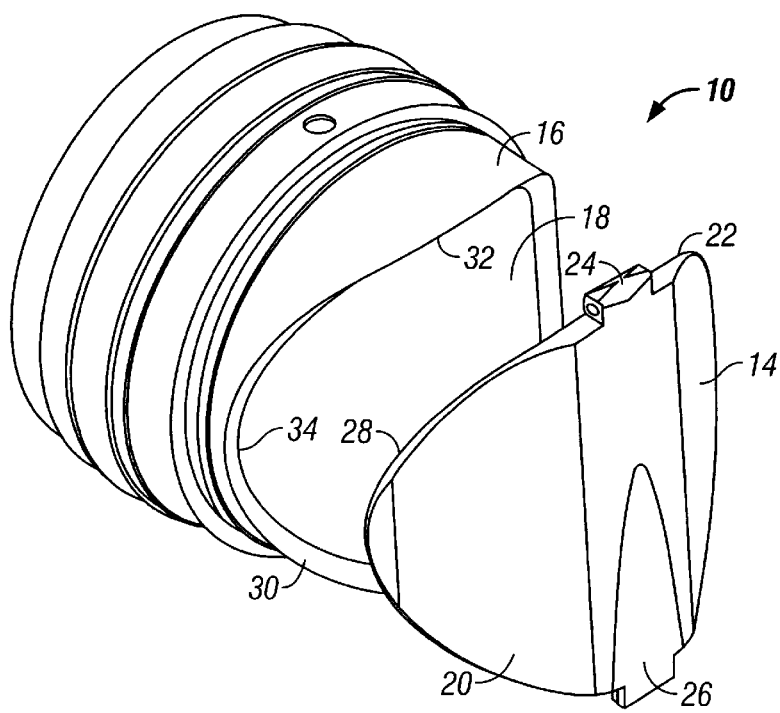
FIG. 1
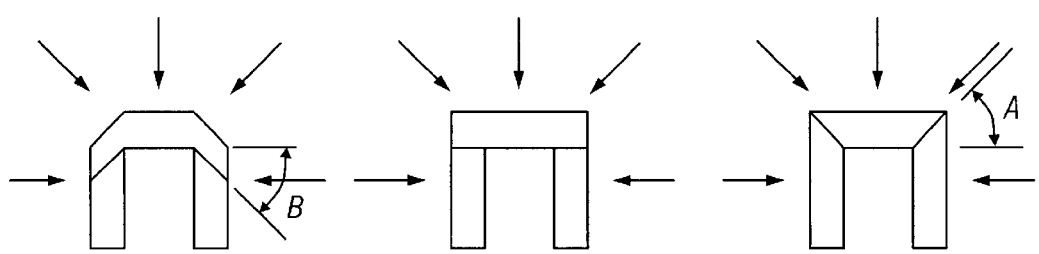
| FIG. 2A | FIG. 2B | FIG. 2C |
| (Prior Art) | (Prior Art) | |

CURVED FLAPPER VALVE

This application claim the benefit of U.S. Provisional Application No. 60/392,673 filed Jun. 27, 2002.

BACKGROUND

1. Field of the Invention

This invention pertains to flapper valves, and particularly to flapper valves used for well completions.

2. Related Art

Flapper valves are often used in subsurface safety valves. Subsurface safety valves are used in wells to contain wellbore fluids, particularly in the event of emergency situations in which there is potential danger to personnel, equipment, or the environment.

SUMMARY OF THE INVENTION

The present invention improves flapper valves by providing a curved flapper and a seat, the flapper and seat each having complementary undulating and tapered perimeters, with sealing surfaces designed to maintain seal integrity under higher pressure, for a given outer diameter to inner diameter ratio, compared to prior art flapper valves.

DESCRIPTION OF FIGURES

FIG. 1 is a perspective drawing of a flapper valve subassembly constructed in accordance with the present invention.

FIG. 2A is a schematic drawing of prior art showing one orientation of sealing surfaces relative to externally applied pressure.

FIG. 2B is a schematic drawing of prior art showing another orientation of sealing surfaces relative to externally applied pressure.

FIG. 2C is a schematic drawing showing an orientation of sealing surfaces relative to externally applied pressure in accordance with the present invention.

DETAILED DESCRIPTION

Figure 3:
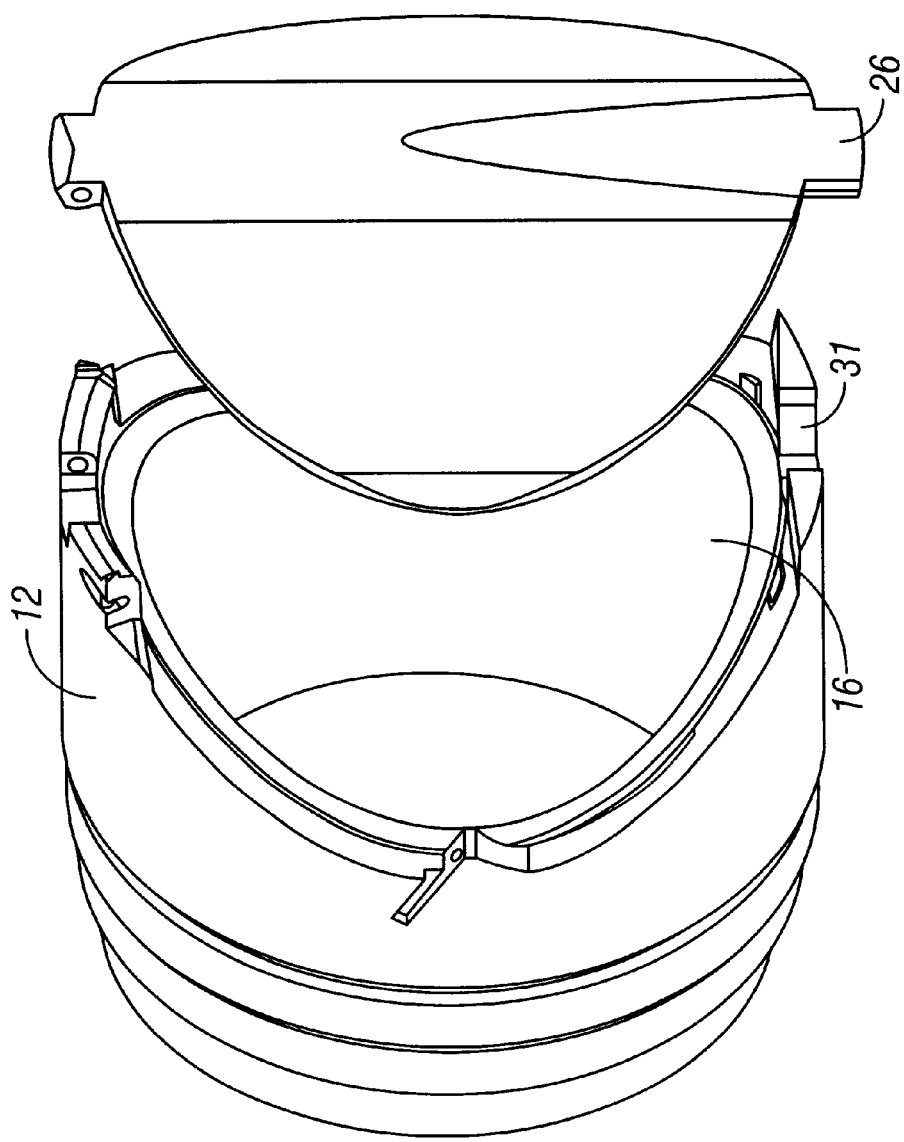
FIG. 3 is a perspective drawing of a flapper valve constructed in accordance with the present invention.
Figure 5:
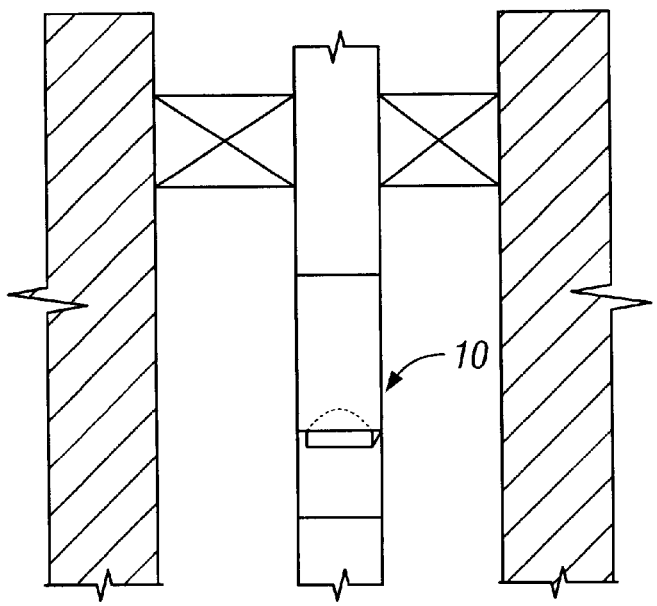
FIG. 5 is a perspective drawing showing a flapper valve constructed in accordance with this invention as an integral part of a completion assembly.

FIGS. 1 and 3 show one embodiment of a flapper valve 10. In this embodiment, flapper valve 10 comprises a housing 12, a flapper 14, and a seat 16. Housing 12 has a bore 18 providing a longitudinal passageway therethrough. Flapper valve 10 is generally installed some desired distance below ground as part of a tubing string (FIG. 5) used to convey fluids between a wellbore and the earth's surface. Bore 18 is in fluid communication with the tubing's interior passageway such that the fluids entering one end of the tubing must pass through bore 18 before exiting the opposite end of the tubing.

Flapper 14, in the embodiment of FIG. 1, is a curved member having a high pressure surface 20 and a low pressure surface 22. The terms "high" and "low" are meant to connote the pressure differential across flapper 14 when flapper 14 is in a closed state, blocking fluid flow from the wellbore to the surface. Flapper 14 has a hinge 24 by which it rotatably mounts to housing 12. Hinge 24 allows flapper 14 to rotate between an open state and the closed state. Flapper 14 also has an orienting finger 26 extending radially outward opposite hinge 24. High pressure surface 20 is curved to conform with the tubing curvature when flapper 14 is in the open state.

Extending between high pressure surface 20 and low pressure surface 22 is a transitional sealing surface 28. Sealing surface 28 can taper radially inward or outward from high pressure surface 20 to low pressure surface 22. In certain embodiments, such as in FIGS. 1, 3 and 4, the taper angle can vary along the perimeter of flapper 14. Flapper 14 has an undulating perimeter.

Seat 16 extends from within housing 12 such that it aligns and mates with flapper 14 when flapper 14 is in the closed state. Seat 16 has a mating sealing surface 30 that conforms to the slope of sealing surface 28 everywhere along sealing surface 30. Seat 16 has an undulating perimeter to conform with that of flapper 14. Thus, seat 16 has crests 32 and valleys 34.

In operation, flapper valve 10 is usually set in either the open or the closed state. When flapper valve 10 is set in the open state, flapper 14 lays adjacent an inner wall of the tubing. Because the curvature of high pressure surface 20 matches the curvature of the tubing, bore 18 is largely unobstructed by flapper 14. This is particularly true when flapper 14 is held against the tubing by a flow tube (not shown), as is well understood in the art.

When flapper valve 10 is set in the closed state, normally by moving the flow tube and allowing a biasing spring (not shown) to act on flapper 14 (all of which is well understood in the art), flapper 14 is rotated to contact seat 16, sealing flapper valve 10 along sealing surfaces 28, 30 and effectively blocking flow through bore 18. Orienting finger 26 engages a slot 31 (FIG. 3) in housing 12 to help align flapper 14 onto seat 16.

In the closed state, pressure from wellbore fluids act on flapper 14 and seat 16. In certain flapper valves 10, flapper 14 may have greater structural strength than seat 16. In other flapper valves 10, seat 16 may have greater structural strength than flapper 14. In still other flapper valves 10, flapper 14 and seat 16 may have comparable structural strengths.

For those cases in which seat 16 is relatively weak with respect to the flapper, the pressure has the most effect near crests 32 of seat 16, inducing them to deflect radialy inward. As used herein, the term "collapse force" refers to the force applied to seat 16 or flapper 14 causing the relevant component to move radially ward. The pressure also applies a net force on flapper 14, driving flapper 14 into seat 16. Tapered sealing surfaces 28, 30 react against each other. If sealing surface 30 slopes radially inward, as shown in FIG. 2C, the net force applied to flapper 14 by the wellbore fluids is transferred across sealing surfaces 28, 30 such that there is a radially outward component applied to seat 16 by flapper 14. Thus, flapper 14 opposes the radially inward deflection of the crests 32 of seat 16. That keeps sealing surfaces 28, 30 properly aligned and mated to maintain an effective seal.

Figure 4:
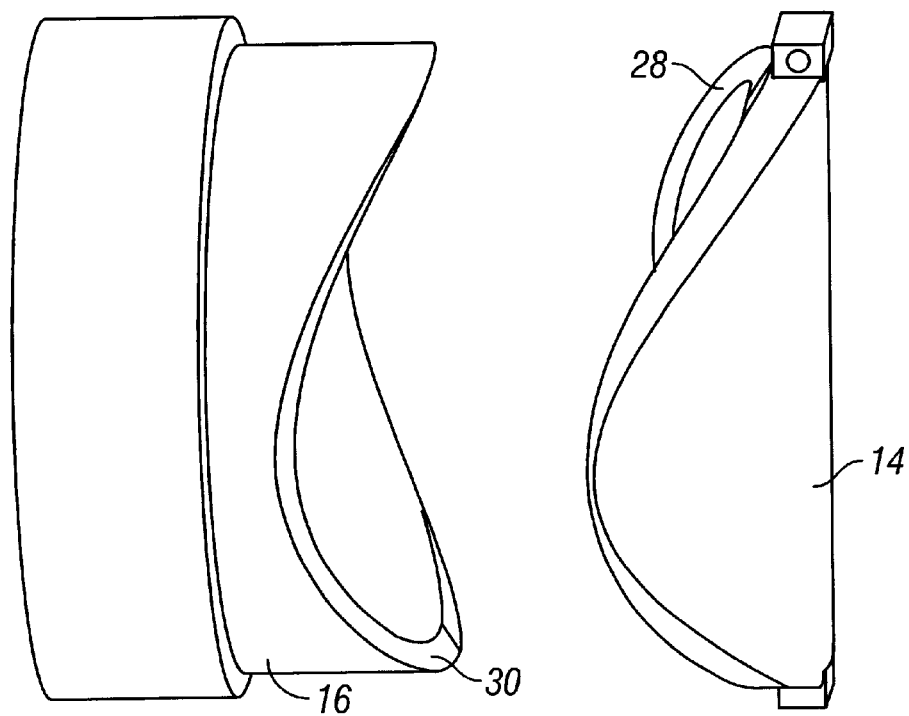
FIG. 4 is a perspective drawing of a flapper valve subassembly constructed in accordance with the present invention.

For those cases in which flapper 14 is relatively weak with respect to the seat, the pressure has the most effect on the portions of flapper 14 near valleys 34 of seat 16, inducing flapper 14 to deflect radially inward. As before, the pressure also applies a net force on flapper 14, driving flapper 14 into seat 16. Tapered sealing surfaces 28, 30 react against each other. If sealing surface 30 slopes radially outward, as shown in FIG. 4 in the vicinity of valleys 34, the radially inward force applied to flapper 14 by the wellbore fluids is opposed by seat 16. Thus, seat 16 opposes the radially inward deflection of flapper 14 in the vicinity of valleys 34 of seat 16. That keeps sealing surfaces 28, 30 properly aligned and mated to maintain an effective seal.

Similarly, the pressure may also tend to deflect flapper 14 radially inward near crests 32 of seat 16. Thus, in some embodiments, it may be desirable for seat 16 to have an outward taper at crests 32 so seat 16 can support flapper 14 at crests 32.

For those cases in which flapper 14 and seat 16 are of comparable structural strength, the pressure has the most effect near crests 32 of seat 16, inducing them to deflect radially inward, and on those portions of flapper 14 near valleys 34 of seat 16, inducing flapper 14 to deflect radially inward. The pressure also applies a net force on flapper 14, driving flapper 14 into seat 16. Tapered sealing surfaces 28, 30 react against each other and flapper 14 and seat 16 reciprocally support each other against the pressure. Specifically, if sealing surface 30 slopes radially inward in the vicinity of crests 32 and radially outward in the vicinity of valleys 34, seat 16 in the vicinity of crests 32 is supported by flapper 14 and flapper 14 in the vicinity of valleys 34 is supported by seat 16. That keeps sealing surfaces 28, 30 properly aligned and mated to maintain an effective seal.

Note that in some embodiments the flapper may be relatively weaker in some portions of the circumference and the seat in other portions. Other factors may also affect the taper of the sealing surfaces. Accordingly, many other embodiments are possible. For example, in one embodiment, the seat supports one portion of the flapper (e.g., a portion that is especially sensitive to radial deflection). In another example, the seat supports the flapper in one portion of the circumference and the flapper supports the seat in another portion.

In FIGS. 2A, 2B, and 2C, the arrows represent the pressure applied by wellbore fluids. In FIG. 2C, the sealing surfaces taper radially inward from the high pressure side of the flapper to the low pressure side. Thus, the flapper and seat reciprocally oppose deformation by the other.

FIG. 2B shows a neutral flapper/seat orientation. In this case, the forces transferred between the elements are all in the longitudinal direction. Thus, no lateral support is provided between the elements, for example at the crests of typical flapper valves.

In FIG. 2A, the sealing surfaces taper radially outward from the high pressure side of the flapper to the low pressure side. Thus, the force from the flapper tends to further deform the seat in the same direction as the pressure, contributing to the seat's collapse in the case of a relatively weak seat 16.

FIG. 4 shows an embodiment of a flapper valve subassembly in which flapper 14 and seat 16 have sealing surfaces 28, 30 designed to mutually and reciprocally support each other against collapse forces applied by wellbore fluids onto the flapper 14 and seat 16. The taper angle can vary from an outward angle, meaning the taper extends radially outward from the high pressure surface 20 to the low pressure surface 22 at valleys 34, to an inward angle, meaning the taper extends radially inward from the high pressure surface 20 to the low pressure surface 22 at the crests 32. In other embodiments, the taper angle may vary from an inward angle at valleys 34 to an outward angle at crests 32. These angles are illustrated in FIGS. 2A and 2C. FIG. 2C shows an inward angle "A" measured form a horizontal or radial reference. FIG. 2A shows an outward angle "B", also measured from a horizontal or radial reference.

Depending on the relative strengths of materials and other design characteristics, some embodiments have shown beneficial results if the taper angle at crest 32 varies between an outward angle of five degrees to an inward angle of sixty degrees, and the taper angle at valley 34 varies between an outward angle of thirty degrees to an inward angle of sixty degrees. The taper angles of each embodiment are selected in light of the preceding discussion.

The flapper and seat can be formed using a wire electrical discharge machining process, a ram or plunge electrical discharge machining process, by milling, or by a combination of those techniques.

Although only a few example embodiments of the present invention are described in detail above, those skilled in the art will readily appreciate that many modifications are possible in the example embodiments without materially departing from the novel teachings and advantages of this invention. Accordingly, all such modifications are intended to be included within the scope of this invention as defined in the following claims. It is the express intention of the applicant not to invoke 35 U.S.C. §112, paragraph 6 for any limitations of any of the claims herein, except for those in which the claim expressly uses the words 'means for' together with an associated function.

We claim:

1. A flapper valve for deployment in a wellbore, comprising:
    a housing;
    a bore through the housing having a longitudinal axis;
    a curved flapper hingedly connected to the housing and rotatable between an open state to allow flow through the bore and a closed state to prevent flow through the bore, the flapper having a first sealing surface;
    a seat within the housing, the seat having a second sealing surface substantially conforming to the first sealing surface and on which the first sealing surface bears when the flapper is in the closed state; and in which
    the first and second surfaces are variably tapered such that a bearing force from the first surface onto the second surface has, along a first portion of the sealing surfaces, a first component directed radially inward relative to the longitudinal axis and, along a second portion of the sealing surfaces, a second component directed radially outward relative to the longitudinal axis.

2. The valve of claim 1 in which the first component has its largest magnitude at valleys of the seat.

3. The valve of claim 1 in which the second component has its largest magnitude at crests of the seat.

4. The valve of claim 1 in which the taper angle of the first sealing surface mating at a seat crest is between an outward angle of five degrees and an inward angle of sixty degrees relative to a line perpendicular to the longitudinal axis and the taper angle of the first sealing surface mating at a seat valley is between an outward angle of thirty degrees and an inward angle of sixty degrees relative to a line perpendicular to the longitudinal axis.

5. The valve of claim 1 in which the second surface is tapered radially inward at and in the vicinity of crests of the seat, and the second surface is tapered radially outward at and in the vicinity of valleys of the seat.

6. The valve of claim 1 in which the second surface is tapered radially inward at and in the vicinity of valleys of the seat, and the second surface is tapered radially outward at and in the vicinity of crests of the seat.

7. The valve of claim 1 further comprising an orienting finger on the flapper.

8. A flapper valve for deployment in a wellbore having wellbore fluids, comprising:

a housing having a bore therethrough about a longitudinal axis;

a flapper having an undulating and tapered first annular perimeter, the flapper being rotatable in the housing; and a seat in the housing having an undulating and tapered second annular perimeter substantially conforming to the first annular perimeter and in sealing engagement with the first annular perimeter when the flapper is in a closed position such that the flapper opposes collapse forces applied by the wellbore fluids onto the seat.

9. The valve of claim 8 in which the flapper provides its maximum support to crests of the seat.

10. The valve of claim 8 in which the taper angle of the first annular perimeter mating at a seat crest is between an inward angle greater than zero degrees and an inward angle of sixty degrees relative to a line perpendicular to the longitudinal axis and the taper angle of the first annular perimeter mating at a seat valley is between an inward angle greater than zero degrees and an inward angle of sixty degrees relative to a line perpendicular to the longitudinal axis.

11. The valve of claim 8 further comprising an orienting finger on the flapper.

12. A flapper valve for deployment in a wellbore having wellbore fluids, comprising:

a housing having a bore therethrough about a longitudinal axis;

a flapper having an undulating and tapered first annular perimeter, the flapper being rotatable in the housing; and a seat in the housing having an undulating and tapered second annular perimeter substantially conforming to the first annular perimeter and in sealing engagement with the first annular perimeter when the flapper is in a closed position such that the seat opposes collapse forces applied by the wellbore fluids onto the flapper.

13. The valve of claim 12 in which the seat provides its maximum support to the flapper in the vicinity of a valley of the seat.

14. The valve of claim 12 in which the taper angle of the first annular perimeter mating at a seat crest is between an outward angle greater than zero degrees and an outward angle of sixty degrees relative to a line perpendicular to the longitudinal axis and the taper angle of the first annular perimeter mating at a seat valley is between an outward angle greater than zero degrees and an outward angle of sixty degrees relative to a line perpendicular to the longitudinal axis.

15. The valve of claim 12 in which the flapper and the seat oppose relative radial deflection along at least a portion of the first and second perimeters.

16. The valve of claim 12 further comprising an orienting finger on the flapper.

17. A flapper valve for deployment in a wellbore having wellbore fluids, comprising:

a housing having a bore therethrough about a longitudinal axis;

a flapper having an undulating and tapered first annular perimeter, the flapper being rotatable in the housing; and a seat in the housing having an undulating and tapered second annular perimeter substantially conforming to the first annular perimeter and in sealing engagement with the first annular perimeter when the flapper is in a closed position such that the flapper and the seat mutually and reciprocally opposes collapse forces applied by the wellbore fluids onto the flapper and the seat.

18. The valve of claim 17 in which the flapper provides its maximum support to crests of the seat.

19. The valve of claim 18 in which the seat provides its maximum support to the flapper in the vicinity of a valley of the seat.

20. The valve of claim 17 in which the seat provides its maximum support to the flapper in the vicinity of a valley of the seat.

21. The flapper valve of claim 17 in which the taper angle of the first annular perimeter mating at a seat crest is between an outward angle of five degrees and an inward angle of sixty degrees relative to a line perpendicular to the longitudinal axis and the taper angle of the first annular perimeter mating at a seat valley is between an outward angle of thirty degrees and an inward angle of sixty degrees relative to a line perpendicular to the longitudinal axis.

22. The flapper valve of claim 17 further comprising an orienting finger on the flapper.

23. A flapper valve subassembly for deployment in a wellbore, comprising:

a flapper having a high pressure surface, a low pressure surface, and an undulating sealing surface extending between the high and low pressure surfaces, the sealing surface variably tapering from the high pressure surface to the low pressure surface;

a seat having a mating sealing surface substantially conforming to the sealing surface of the flapper; and in which the taper angle of the first sealing surface mating at a seat crest is between an outward angle of five degrees and an inward angle of sixty degrees relative to a line perpendicular to the longitudinal axis and the taper angle of the first sealing surface mating at a seat valley is between an outward angle of thirty degrees and an inward angle of sixty degrees relative to a line perpendicular to the longitudinal axis.

24. A method to reduce relative deflection of a flapper and a seat in a flapper valve, the flapper and the seat having mating sealing surfaces, the method comprising:

tapering at least a portion of the sealing surfaces radially inward, radially outward, or a combination of radially inward and outward, such that the flapper supports the seat, the seat supports the flapper, or the flapper and seat mutually and reciprocally support each other to oppose collapse forces applied by wellbore fluids.

* * * * *